US012337568B2

(12) United States Patent
Turner et al.

(10) Patent No.: US 12,337,568 B2
(45) Date of Patent: Jun. 24, 2025

(54) METHOD FOR CUSTOMIZING A BLANK, AND THE RESULTING BLANK

(71) Applicant: DS SMITH PLC, London (GB)

(72) Inventors: Russell Turner, Monmouth (GB); Stephen James Pointon, Stone (GB)

(73) Assignee: DS SMITH PLC, London (GB)

( * ) Notice: Subject to any disclaimer, the term of this patent is extended or adjusted under 35 U.S.C. 154(b) by 172 days.

(21) Appl. No.: 18/249,177

(22) PCT Filed: Oct. 14, 2021

(86) PCT No.: PCT/EP2021/078393

§ 371 (c)(1),
(2) Date: Apr. 14, 2023

(87) PCT Pub. No.: WO2022/079143

PCT Pub. Date: Apr. 21, 2022

(65) Prior Publication Data

US 2023/0391037 A1 Dec. 7, 2023

(30) Foreign Application Priority Data

Oct. 16, 2020 (GB) ..................................... 2016423

(51) Int. Cl.
*B31B 50/25* (2017.01)
*B65D 5/02* (2006.01)
*B65D 5/42* (2006.01)

(52) U.S. Cl.
CPC .......... *B31B 50/256* (2017.08); *B65D 5/0227* (2013.01); *B65D 5/029* (2013.01); *B65D 5/4266* (2013.01)

(58) Field of Classification Search
CPC .... B65D 5/0227; B65D 5/029; B65D 5/4266; B65D 81/05; B65D 5/061; B65D 5/02;
(Continued)

(56) References Cited

U.S. PATENT DOCUMENTS 4,313,556 A * 2/1982 Boyle .................... B65D 5/029 229/110
6,209,291 B1 4/2001 Delén et al.
(Continued)

FOREIGN PATENT DOCUMENTS

CN 104540742 B * 7/2017 ............... B65D 5/02
FR 2068063 A5 8/1971
(Continued)

OTHER PUBLICATIONS

International Search Report for International Patent Application No. PCT/EP2021/078393, mailed Jan. 19, 2022.

*Primary Examiner* — Christopher R Demeree
(74) *Attorney, Agent, or Firm* — Armstrong Teasdale LLP

(57) ABSTRACT

A method for customizing a blank of sheet material delimited by first and second opposite sides and third and fourth opposite sides orthogonal to the first and second sides involves doing, on a face of the blank, a first couple of first and second wave-shaped crease lines and a second couple of third and fourth wave-shaped crease lines, each wave-shaped crease line being crossed by straight crease tracts, so that the third side, the first, second, third and fourth wave-shaped crease lines and fourth side delimit in succession a first top panel, a first side panel, a bottom panel, a second side panel and a second top panel, doing first and second continuous straight crease lines parallel to each other and to the straight crease tracts and delimiting respective back and front wings of each of the first top panel, first side panel, bottom panel, second side panel and second top panel. Glue is transversally applied to the straight crease lines.

12 Claims, 6 Drawing Sheets

(58) Field of Classification Search
CPC . B65D 5/06; B65D 5/42; B65D 5/064; B65D 5/0209; B65D 71/36; B65D 85/1048; B65D 2571/00919; B65D 5/425
USPC ........ 229/100, 116.1, 190, 108; 220/62, 677
See application file for complete search history.

(56) References Cited

U.S. PATENT DOCUMENTS

| | | | | | |
|---|---|---|---|---|---|
| D596,027 | S * | 7/2009 | Kalberer | D9/432 | |
| 9,809,348 | B2 * | 11/2017 | Smalley | B65D 5/425 | |
| 10,669,061 | B2 * | 6/2020 | Smalley | B65D 5/10 | |
| 11,299,314 | B2 * | 4/2022 | Dammers | B65D 5/4266 | |
| 11,667,428 | B2 * | 6/2023 | Barbieri | B32B 27/10 | 229/137 |
| 11,897,671 | B2 * | 2/2024 | Gierow | B65D 5/40 | |
| 12,037,167 | B2 * | 7/2024 | Barbieri | B65D 5/02 | |
| 12,139,310 | B2 * | 11/2024 | Gierow | B65D 5/064 | |
| 2011/0113733 | A1 * | 5/2011 | Franic | B65D 5/4266 | 53/167 |

FOREIGN PATENT DOCUMENTS

| | | | |
|---|---|---|---|
| IT | UA20162140 | A1 | 10/2017 |
| JP | S547925 | U | 1/1979 |
| JP | 5148943 | B2 | 2/2013 |

* cited by examiner

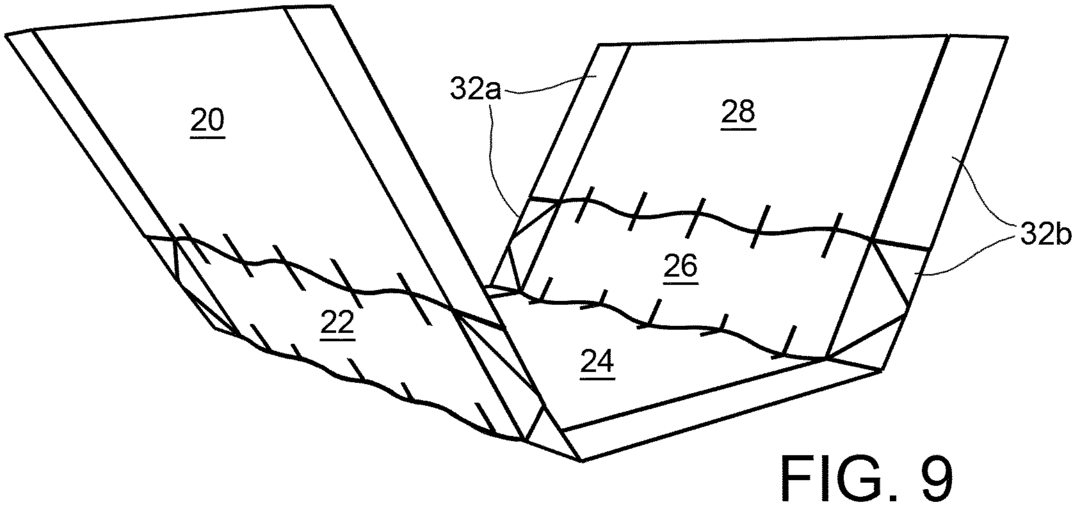
FIG. 9
FIG. 10
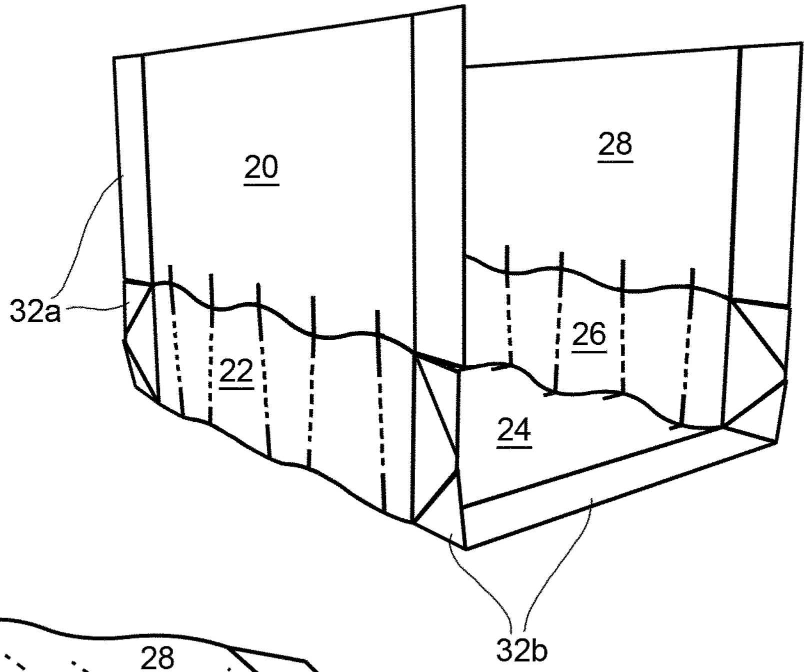
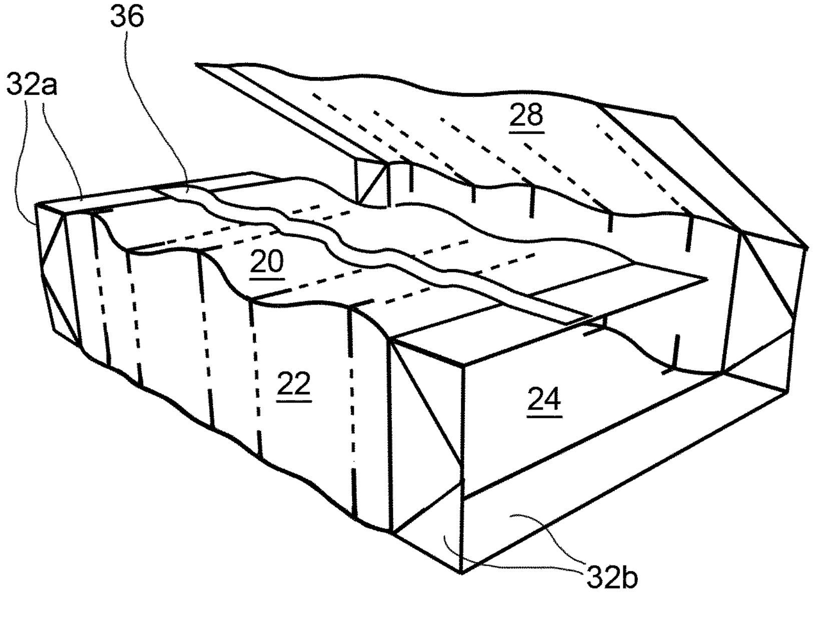
FIG. 11

METHOD FOR CUSTOMIZING A BLANK, AND THE RESULTING BLANK

CROSS-REFERENCE TO RELATED APPLICATION

This application is a National Stage Application of International Patent Application No. PCT/EP2021/078393, having an International Filing Date of Oct. 14, 2021, which claims priority to British Patent Application No. 2016423.2, filed Oct. 16, 2020, the entire contents of which are incorporated by reference herein.

FIELD OF THE INVENTION

The present invention relates to a method for customizing a blank of cardboard, corrugated cardboard or the like sheet material, so that it can be folded into a package suitable for containing at least one given item, the thus obtainable blank and the package obtained by folding the blank.

SUMMARY OF THE INVENTION

One object of the present invention consists in enabling a 'right sized' package to be created on demand, allowing fast and efficient forming and filling thereof.

According to the present invention, this object is achieved by means of a method for customizing a blank of cardboard, corrugated cardboard or the like sheet material, which is delimited by first and second parallel opposite sides and third and fourth opposite sides which are orthogonal to said first and second sides, so that it can be folded into a package suitable for containing at least one item to be shipped, comprising the steps of:

- doing on a face of the blank a first couple of a first and second wave-shaped crease lines and a second couple of third and fourth wave-shaped crease lines, each of said wave-shaped crease lines being crossed by a plurality of straight crease tracts distanced from each other and aligned with corresponding straight crease tracts of the other wave-shaped crease line and parallel to said first and second sides, so that said third side, said first, second, third and fourth wave-shaped crease lines and fourth side delimit in succession a first top panel, a first side panel, a bottom panel, a second side panel and a second top panel,
- doing in portions of said face of the blank, which are adjacent to the first and second sides, respectively, first and second continuous straight crease lines which are parallel to each other and to the said crease tracts, and delimit respective back and front wings of each of said first top panel, first side panel, bottom panel, second side panel and second top panel, and
- applying at least one strip of glue transversally to said straight crease lines in at least a portion of the blank adjacent to said third or fourth side.

Advantageously, the distance between each couple of wave-shaped crease lines and/or the distance between the wave-shaped crease lines of each couple are selected on the basis of the item to be packaged.

Preferably, each of said wave-shaped crease lines is done by rotation on said face of the blank of a respective wheel provided on its periphery of a wave-shaped continuous circumferential projection with transversal circumferentially distanced protrusions.

A further subject-matter of the present invention is constituted by a blank obtainable by the above method.

A further subject-matter of the present invention is constituted by a package obtainable from such a blank by folding of 90° said first side panel about the second wave-shaped crease line and said second side panel about the third wave-shaped crease line, respectively, and successively said first top panel about the first wave-shaped crease line and said second top panel about the fourth wave-shaped crease line, respectively, and folding of 90° the wings with regard to the respective continuous straight crease line, so that a front wall and a back wall, respectively, are formed.

The package of the invention has the back wall and the front wall, which are flat, and top, bottom, left side and right side walls, which are undulated.

A further subject-matter of the present invention is constituted by a method for packaging an item by the above package, wherein said item is placed on the bottom panel prior to effecting any folding of the panels.

A further subject-matter of the present invention is constituted by a method for packaging an item by the above package, wherein said item is inserted into the folded blank prior to the formation of the front wall and the back wall.

A further subject-matter of the present invention is constituted by a method for packaging an item by the above package, wherein said item is inserted into the folded blank after the formation of the back wall, but prior to the formation of the front wall.

As already indicated, due to the peculiar wave-shaped crease lines, the bottom, top and side panels of the package of the invention are not flat, but undulated with peak and valleys whose formation is favored by the presence of the straight crease tracts or "nudge" creases. Such undulations render the package of the invention quite resistant to external stresses, allow interlocking and nesting with a more secure stacking and create a buffer protection for the one or more packaged items. In particular, the package of the invention, once formed, cannot be flattened even under severe push or pressure, so that it exhibits improved performance and resistance in comparison with conventional packages wherein all the faces are flat and the edges thereof are rectilinear.

The package of the invention is designed and optimized for e-commerce, eliminates need for dunnage and waste, minimizes space in logistics network, is easy for customer to open, reuse and/or recycle, may use completely sustainable materials and enables damage free delivery.

BRIEF DESCRIPTION OF THE FIGURES

Further advantages and features of the present invention will be apparent from the following detailed description, given by way of non-limiting example with reference to the appended drawings, in which:

FIGS. 9 to 12 are perspective views illustrating successive steps of the erection of the blank of FIG. 1 into a package without any item.

DETAILED DESCRIPTION

Figure 1:
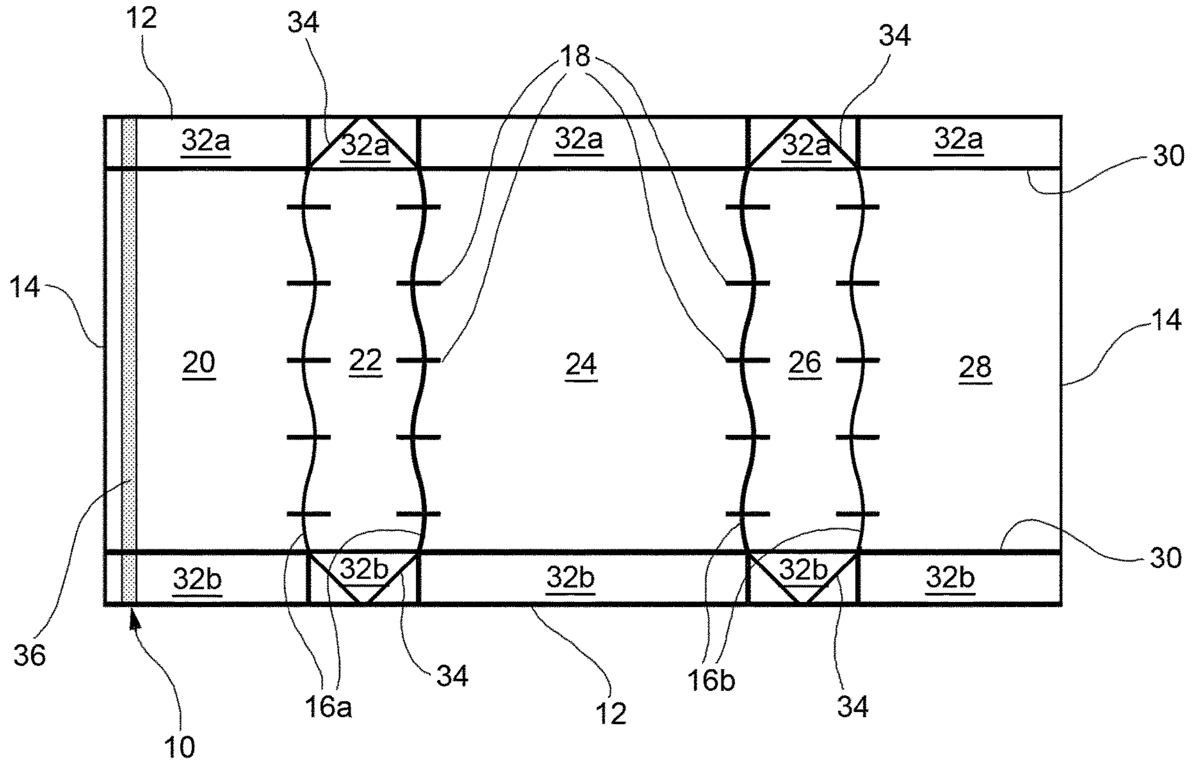
FIG. 1 is a plan view of a blank according to the invention.

FIG. 1 illustrates a blank 10 of cardboard, corrugated cardboard or the like sheet material, which is delimited by first and second parallel opposite sides 12 and third and fourth opposite sides 14 which are orthogonal to the first and second sides 12, so that the blank 10 has a rectangular perimeter. Of course, the general definition "rectangular" includes the peculiar case of "square".

A first couple of a first and second wave-shaped crease lines 16*a* and a second couple of third and fourth wave-shaped crease lines 16*b* are present on a face of the blank 10.

Each wave-shaped crease line 16*a*, 16*b* is crossed by a plurality of straight crease tracts 18, also called "nudge creases", distanced from each other and aligned with corresponding straight crease tracts 18 of the other wave-shaped crease lines 16*a*, 16*b* and parallel to the first and second sides 12. The nudge creases 18 are present in correspondence of peak and valleys of the respective wave-shaped crease lines 16*a*, 16*b*.

Accordingly, the third side 14, the first, second, third and fourth wave-shaped crease lines 16*a*, 16*b* and the fourth side 14 delimit in succession a first top panel 20, a first side panel 22, a bottom panel 24, a second side panel 26 and a second top panel 28.

First and second continuous straight crease lines 30 which are parallel to each other and to the nudge creases 18 are present in portions of the blank 10, which are close to the first and second sides 12, respectively. The continuous straight crease lines 30 delimit respective back and front wings 32*a*, 32*b* of each of the first top panel 20, first side panel 22, bottom panel 24, second side panel 26 and second top panel 28.

A V-shaped crease line 34 is present in the wings 32*a*, 32*b* of the first and second side panels 22, 26.

A strip of glue 36 is applied, transversally to the straight crease lines 30, on a portion of the blank 10 close to the third side 14 and on the face opposite to the creased one.

Figure 2:
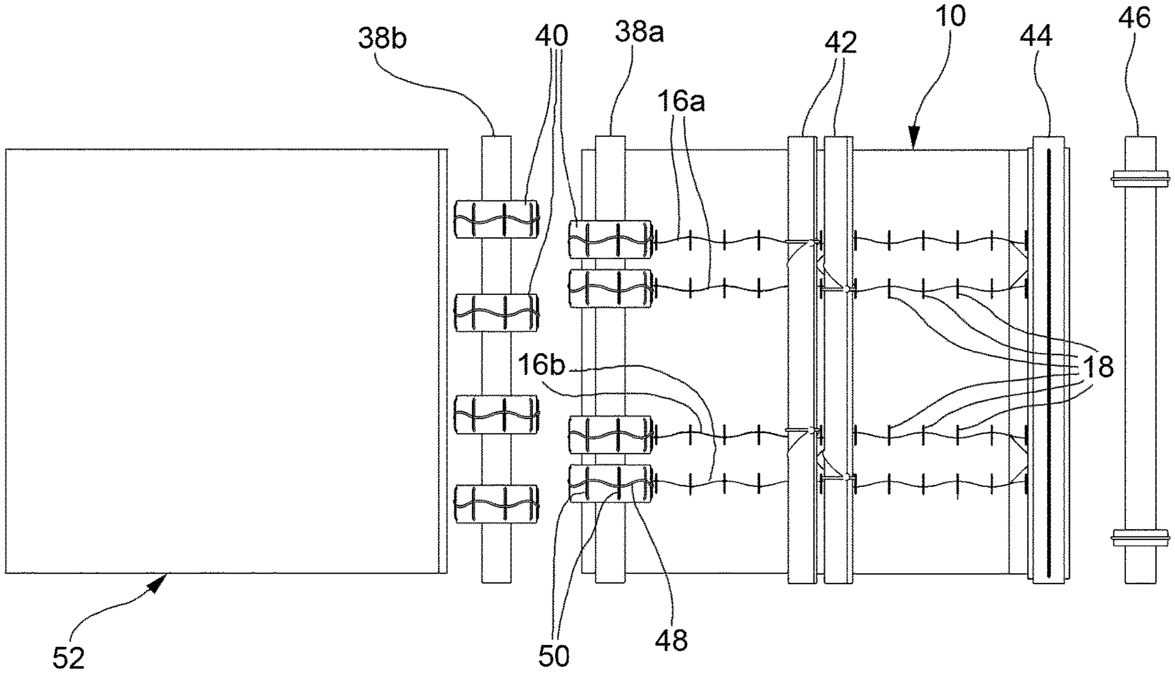
FIG. 2 a plan view schematically illustrating the production of the blank of FIG. 1, FIGS. 3 to 8 are perspective views illustrating successive steps of the erection of the blank of FIG. 1 into a package around an item to be packaged.

An equipment suitable for the production of the previously disclosed blank 10 is illustrated in FIG. 2 and includes creasing shafts 38*a*, 38*b* with wheels 40, further creasing shafts 42, a cutting shaft 44 and a trimming shaft 46.

Each wheel 40 is fixed to the associated shaft 38*a*, 38*b* and is provided on its periphery of a wave-shaped continuous circumferential projection 48 with transversal circumferentially distanced protrusions 50, so that it produces a wave-shaped crease line with the associated nudge creases by rotating on the virgin blank.

The arrangement of the wheels 40 along the shafts 38*a*, 38*b* may be set as desired, so that the distance between each couple of wave-shaped crease lines 16*a*, 16*b* and the distance between the wave-shaped crease lines 16*a*, 16*b* of each couple may be suitably selected on the basis of the item to be packaged, customizing the shape of the package.

There are two shafts 38*a*, 38*b* with wheels 40 in order to allow production flexibility and avoiding dead times: only one shaft 38*a* is indeed operating in order to produce a given blank 10, whereas the other not operative shaft 38*b* may be preliminary adjusted with a different distance between the wheels 40 for creasing a successive blank 52 which is suitable for packaging a different item.

Successively and in conventional ways, the creasing shafts 42 produce the continuous straight crease lines 30 and the V-shaped crease lines 34, the shaft 44 cuts the blank 10 to the desired length and the shaft 46 performs optional trimming operations.

FIGS. 3 to 8 illustrate successive steps of the erection of the blank 10 into a package.

Figure 3:
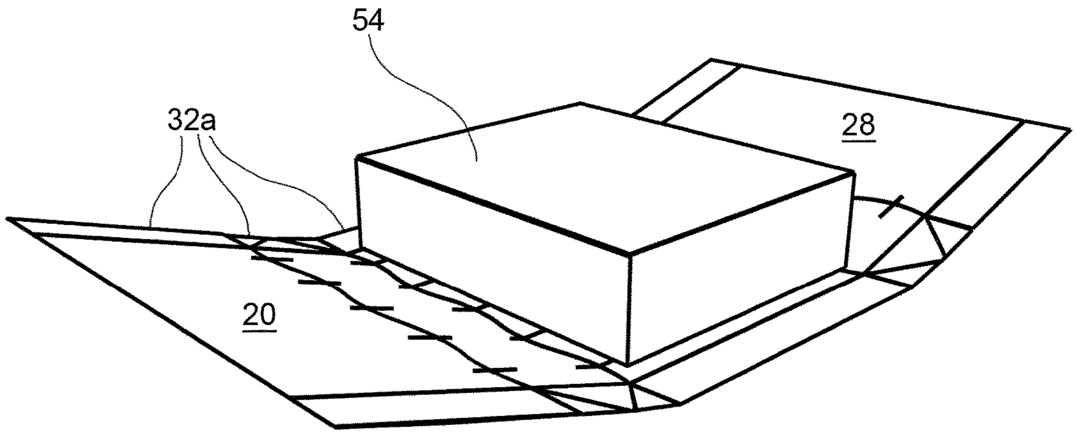

First of all, an item 54 to be packaged for shipping is placed on the bottom panel 24 (FIG. 3). For the sake of clarity, only a single item 54 is illustrated in the figures, but it would be likewise possible to package together a plurality of equal or different items.

Figure 4:
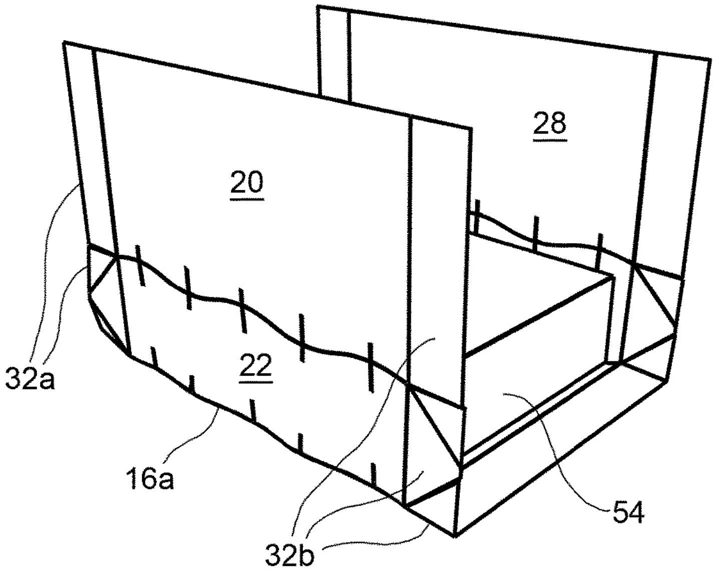
Figure 5:
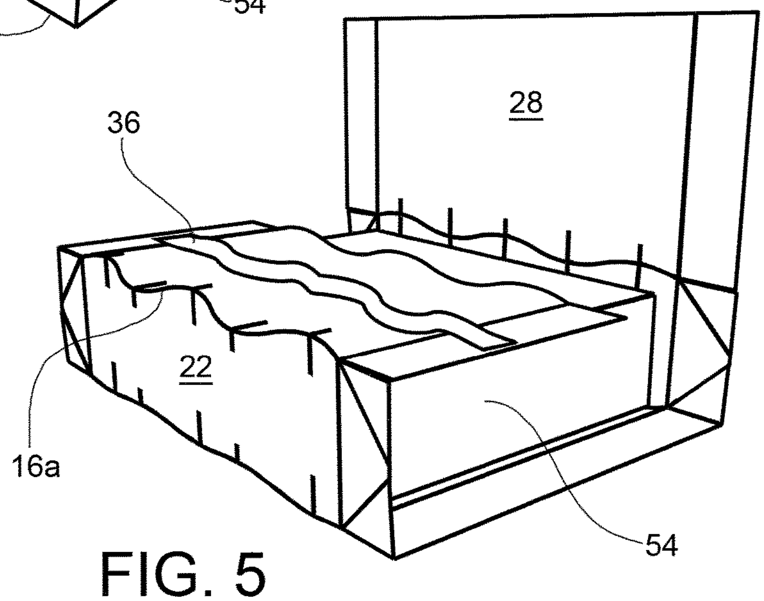
Figure 6:
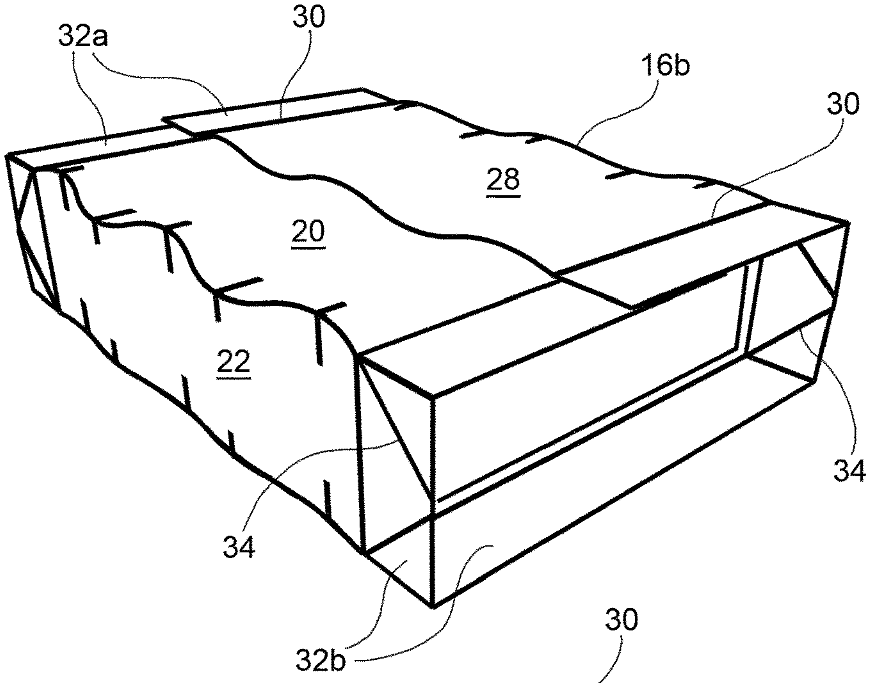

Then, the first side panel 22 is folded of 90° about the second wave-shaped crease line 16*a* and the second side panel 26 about the third wave-shaped crease line 16*b* (FIG. 4). Successively, the first top panel 20 is folded of 90° about the first wave-shaped crease line 16*a* (FIG. 5) and the second top panel 28 about the fourth wave-shaped crease line 16*b* (FIG. 6). The two top panels 20, 28 adhere to each other due to the presence of the glue strip 36 and form together a top wall of the package, so that the originally flat blank 10 takes a "sleeve" configuration, whose walls are not flat but undulated due to the wave-shaped crease lines 16*a*, 16*b* constituting curvilinear sharp edges of the walls of the sleeve and to the "nudge" creases favoring the formation of peaks and valleys of the undulated walls.

Figure 7:
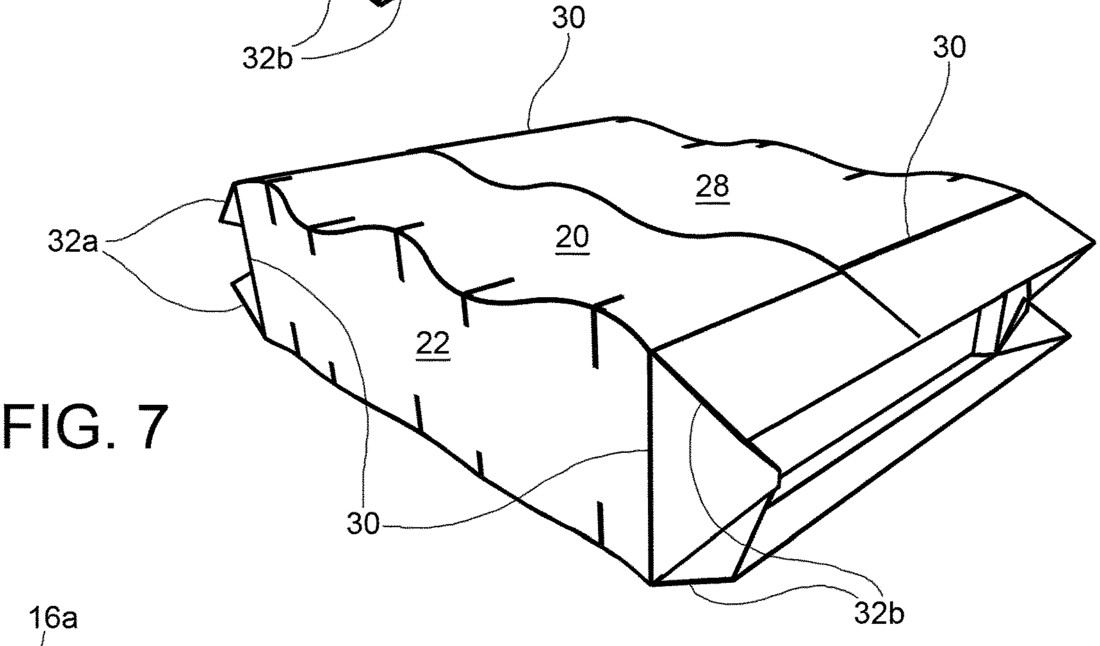

Afterwards, the wings 32*a*, 32*b* are folded of 90° about the respective continuous straight crease line 30, so that a back wall and a front wall, respectively, are formed (FIG. 7). The presence of the V-shaped crease line 34 in the wings 32*a*, 32*b* of the first and second side panels 22, 26 allows that each of these wings 32*a*, 32*b* may be folded in three triangular portions. Eventually, the front and back walls are sealed by respective lengths of adhesive tape 56 (FIG. 8), so that a sealed package containing the item 54 to be shipped is obtained.

Figure 8:
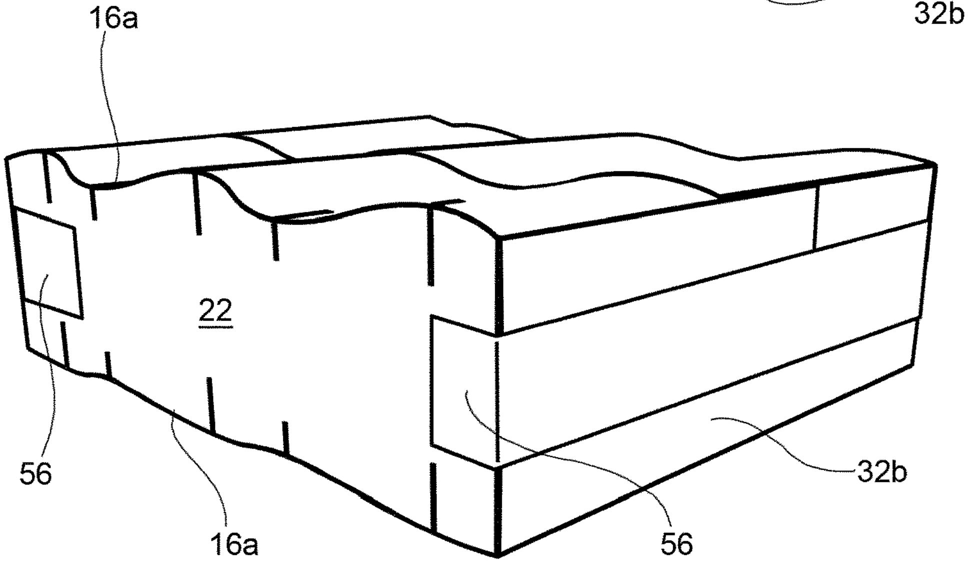

The same operations illustrated by FIGS. 3 to 6 may also be effected without preliminary placing the item 54 to be packaged on the bottom panel 24, as illustrated by FIGS. 9 to 12. The item 54 is inserted (FIG. 13) only at that time within the "sleeve"-configured blank which is likewise horizontally arranged and, eventually, the operations illustrated by FIGS. 7 and 8 are effected, obtaining also in this case a sealed package containing the item 54 to be shipped.

Figure 12:
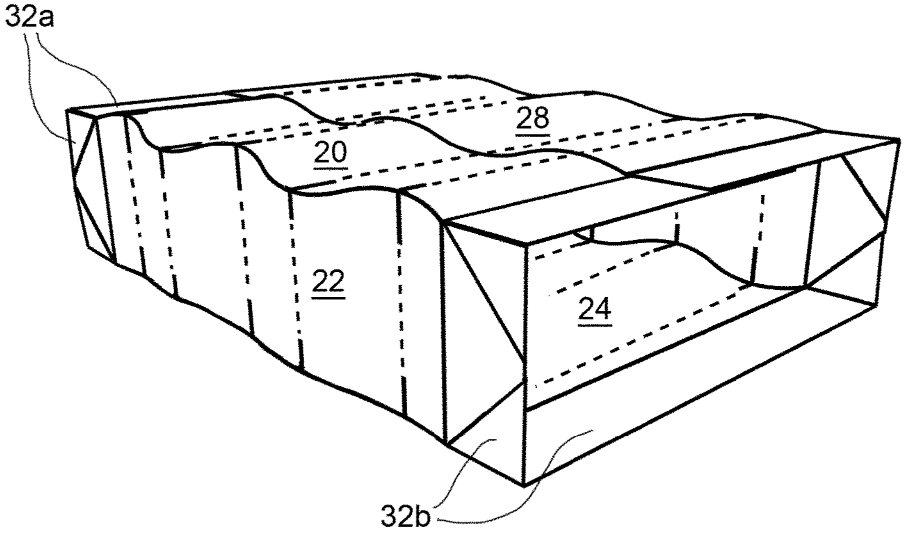
Figure 13:
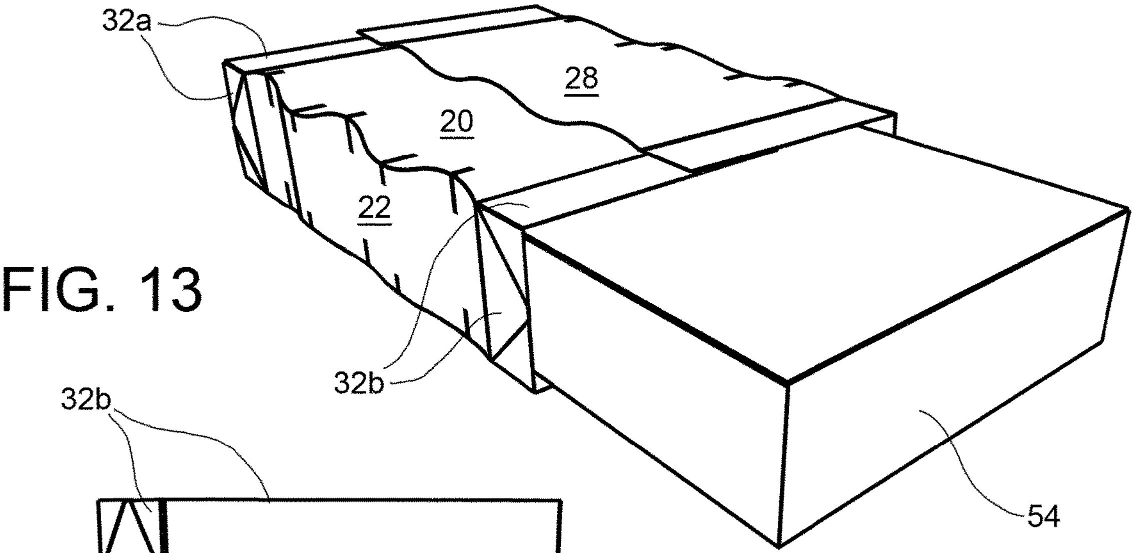
FIG. 13 is a perspective views illustrating the insertion of an item within the package obtained through the erection process illustrated in FIGS. 9 to 12, and FIGS. 14 to 17 are perspective views illustrating successive steps of an alternative procedure of insertion and final packaging of an item within the package obtained through the erection process illustrated in FIGS. 9 to 12.
Figure 14:
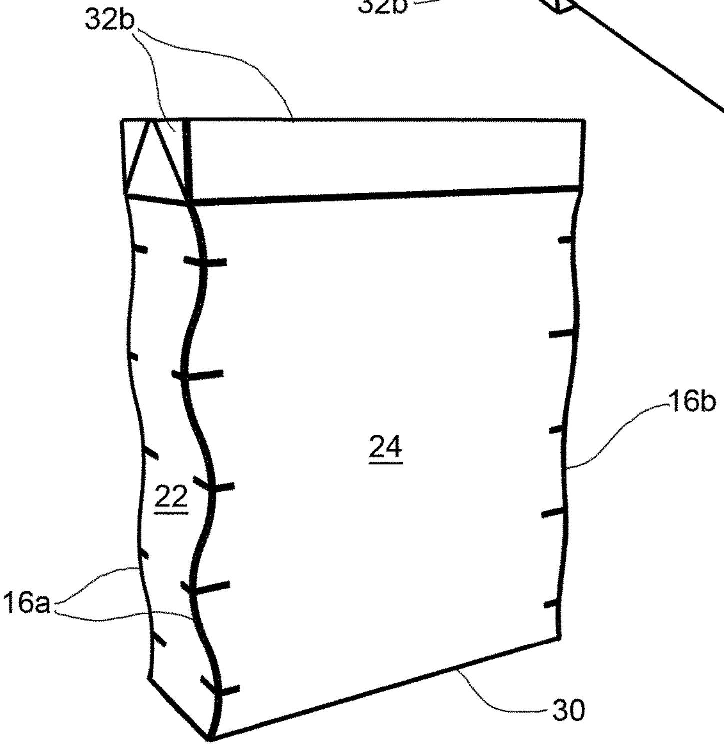
Figure 15:
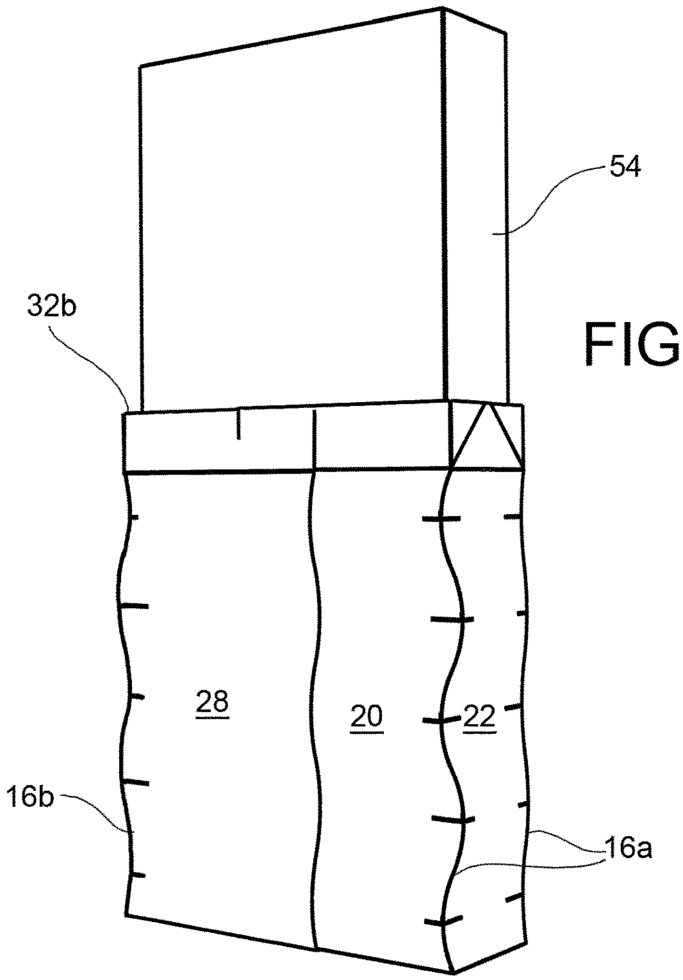
Figure 16:
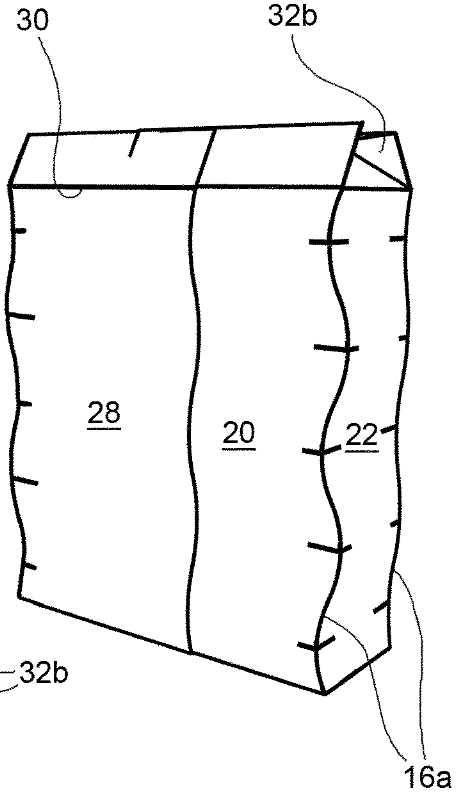
Figure 17:
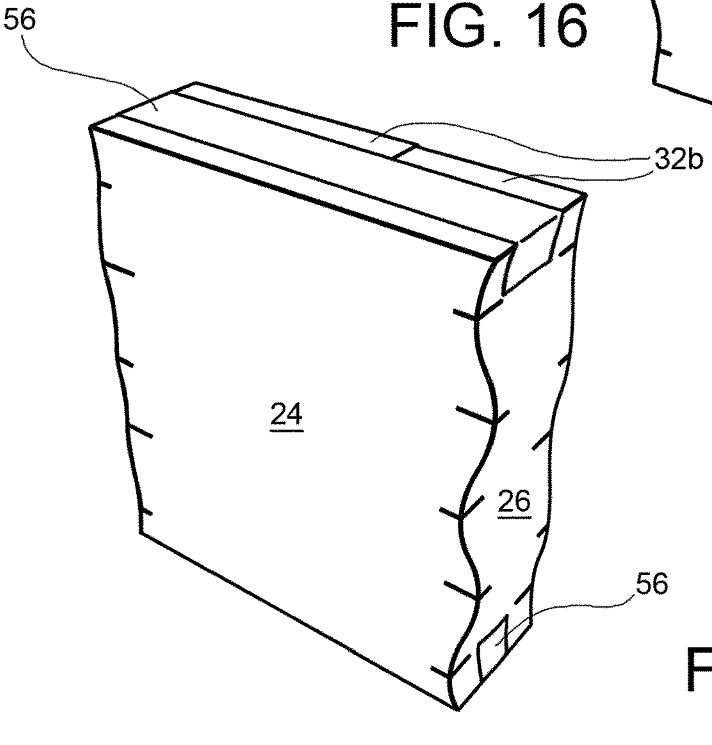

Alternatively, the back wings 32*a* of the "sleeve"-configured blank of FIG. 12 may be preliminary folded, so that the back wall is formed and the blank may be arranged vertically by resting on such back wall (FIG. 14) which now is placed at the bottom. Successively, the item 54 to be shipped is inserted (FIG. 15) within the open top portion of the blank, the front wall—which now is placed at the top—is formed by folding the wings 32*b* of 90° about the respective crease line 30 (FIG. 16), and the front and back walls are sealed by respective lengths of adhesive tape 56 (FIG. 17), obtaining also in this case a sealed package containing the item 54 to be shipped.

The several above-disclosed packaging procedures are thus illustrative of the operative flexibility allowed by the package of the present invention, in addition to its adaptability to volume and shape of the one or more items to be packaged thereby.

Naturally, the principles of the invention remaining the same, the details of construction and embodiments may be widely varied with respect to those described purely by way of example, without thereby departing from the claimed scope.

What is claimed is:

1. A method for customizing a blank of cardboard, corrugated cardboard or the like sheet material, which is delimited by first and second parallel opposite sides and third and fourth opposite sides orthogonal to said first and second parallel opposite sides, so that the blank is foldable into a package suitable for containing at least one item to be to be packaged for shipping, the method comprising:

doing on a face of the blank a first couple of first and second wave-shaped crease lines and a second couple of third and fourth wave-shaped crease lines, each of said wave-shaped crease lines being crossed by a plurality of straight crease tracts distanced from each other and aligned with corresponding straight crease tracts of the other wave-shaped crease lines and parallel to said first and second parallel opposite sides, so that said third side, said first, second, third and fourth wave-shaped crease lines and fourth side delimit in succession a first top panel, a first side panel, a bottom panel, a second side panel and a second top panel, doing in portions of said face of the blank, which are close to the first and second parallel opposite sides, respectively, first and second continuous straight crease lines which are parallel to each other and to said straight crease tracts, and delimit respective back and front wings of each of said first top panel, first side panel, bottom panel, second side panel and second top panel, and applying at least one strip of glue, transversally to said straight crease lines on at least a portion of the blank close to said third or fourth side.

2. The method of claim 1, wherein a distance between each couple of wave-shaped crease lines and/or a distance between the wave-shaped crease lines of each couple are selected on the basis of the at least one item to be packaged.

3. The method of claim 1, wherein a V-shaped crease line is done in the back and front wings of said first and second side panels.

4. The method of claim 1, wherein said straight crease tracts are present in correspondence of peaks and valleys of respective wave-shaped crease lines.

5. The method of claim 1, wherein each of said wave-shaped crease lines is done by rotation on said face of the blank of a respective wheel provided on its periphery of a wave-shaped continuous circumferential projection with transversal circumferentially distanced protrusions.

6. The method of claim 5, wherein all wheels creasing the blank are fixed to a common shaft.

7. A blank obtainable by a method for customizing a blank of cardboard, corrugated cardboard or the like sheet material, which is delimited by first and second parallel opposite sides and third and fourth opposite sides orthogonal to said first and second parallel opposite sides, so that the blank is foldable into a package suitable for containing at least one item to be to be packaged for shipping, the method comprising:

doing on a face of the blank a first couple of first and second wave-shaped crease lines and a second couple of third and fourth wave-shaped crease lines, each of said wave-shaped crease lines being crossed by a plurality of straight crease tracts distanced from each other and aligned with corresponding straight crease tracts of the other wave-shaped crease lines and parallel to said first and second parallel opposite sides, so that said third side, said first, second, third and fourth wave-shaped crease lines and fourth side delimit in succession a first top panel, a first side panel, a bottom panel, a second side panel and a second top panel, doing in portions of said face of the blank, which are close to the first and second parallel opposite sides, respectively, first and second continuous straight crease lines which are parallel to each other and to said straight crease tracts, and delimit respective back and front wings of each of said first top panel, first side panel, bottom panel, second side panel and second top panel, and applying at least one strip of glue, transversally to said straight crease lines on at least a portion of the blank close to said third or fourth side.

8. A package obtainable from a blank according to claim 7 by folding of 90° said first side panel about the second wave-shaped crease line and said second side panel about the third wave-shaped crease line, respectively, and successively said first top panel about the first wave-shaped crease line and said second top panel about the fourth wave-shaped crease line, respectively, and folding of 90° the back and front wings about a respective continuous straight crease line, so that a back wall and a front wall, respectively, are formed.

9. The package of claim 8, wherein the back wall and the front wall are flat, and top, bottom, left side and right side walls are undulated.

10. A method for packaging an item by a package according to claim 8, wherein said item is placed on the bottom panel prior to effecting folding of the panels.

11. A method for packaging an item by a package according to claim 8, wherein said item is inserted into the folded blank prior to formation of the front wall and the back wall.

12. A method for packaging an item by a package according to claim 8, wherein said item is inserted into the folded blank after formation of the back wall, but prior to formation of the front wall.

* * * * *